Figure 1:
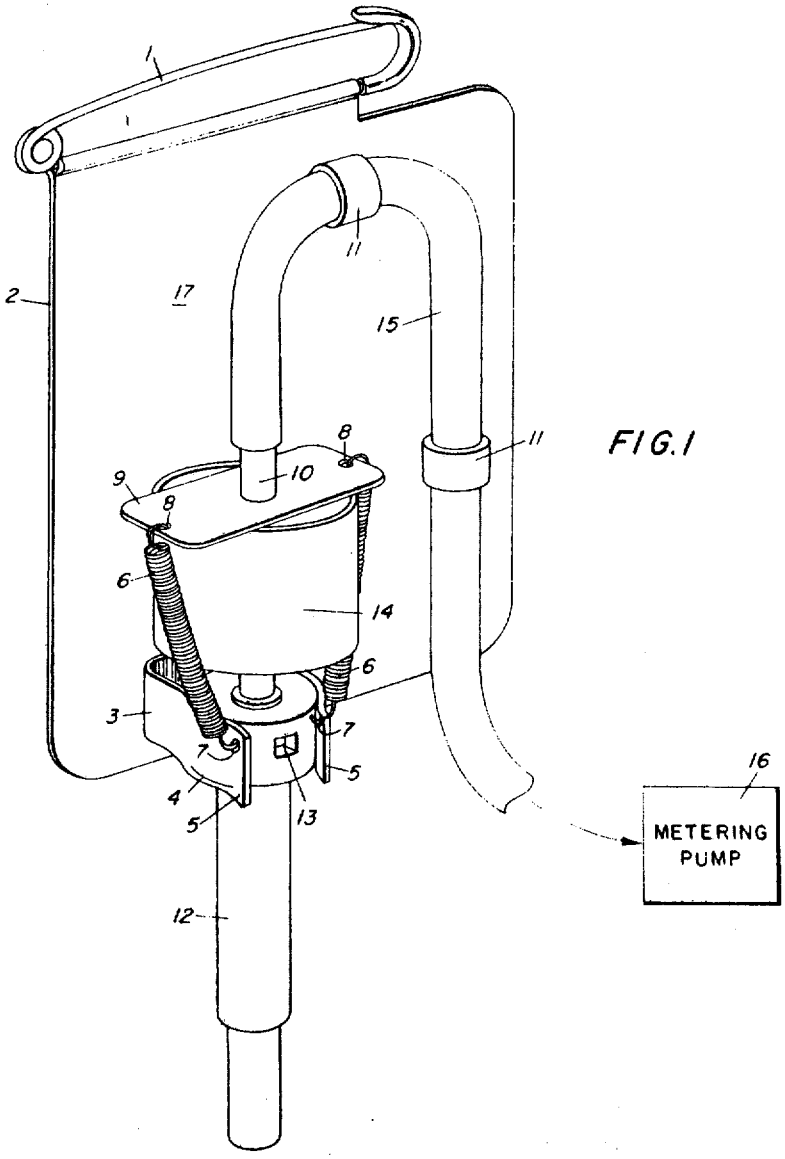
Figure 2:
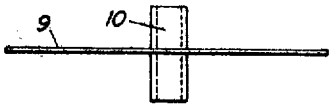

T 868,006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 18, 1969

868 O.G. 731

789,577
PERSONAL DUST SAMPLER HOLDER
John B. Shutack, 354 Knoedler Road, Pittsburgh, Pa. 15236
Filed Jan. 7, 1969. Published Nov. 18, 1969
Int. Cl. B01d *45/12*
U.S. Cl. 55—337
1 Sheet Drawing. 5 Pages Specification

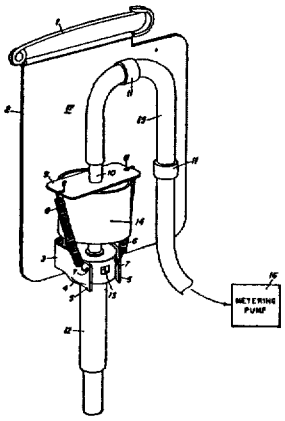

Spring action retainers hold a particle separation cyclone and an air filter in operative position for filtering air samples drawn through an inlet aperture in the cyclone. The retainers include a fuse-type spring clip and a flat apertured retaining plate joined to the clip by coil springs. The filter and cyclone are supported by the clip at the neck of the cyclone adjacent the inlet aperture. The retaining plate, positioned over the filter, biases the cyclone and filter combination against a flange on the lower portion of the clip. A tubular connector, secured through the aperture in the retaining plate, connects with the filter on one side, and with a vacuum hose on the other side for connecting the filter outlet to the inlet of an air metering pump. The clip and several hose guides are secured to a supporting plate which includes a pin-type fastener for attaching the sampler holder to the garment of a person in his breathing zone when collecting respirable dust samples.

T868,006

789577
DEF. PUB.

Nov. 18, 1969

J. B. SHUTACK

PERSONAL DUST SAMPLER HOLDER

Filed Jan. 7, 1969

INVENTOR
JOHN B. SHUTACK
BY Ernest S. Cohen
ATTORNEY